No. 689,507. Patented Dec. 24, 1901.
D. W. MYERS.
GATE.
(Application filed Sept. 10, 1901.)
(No Model.)
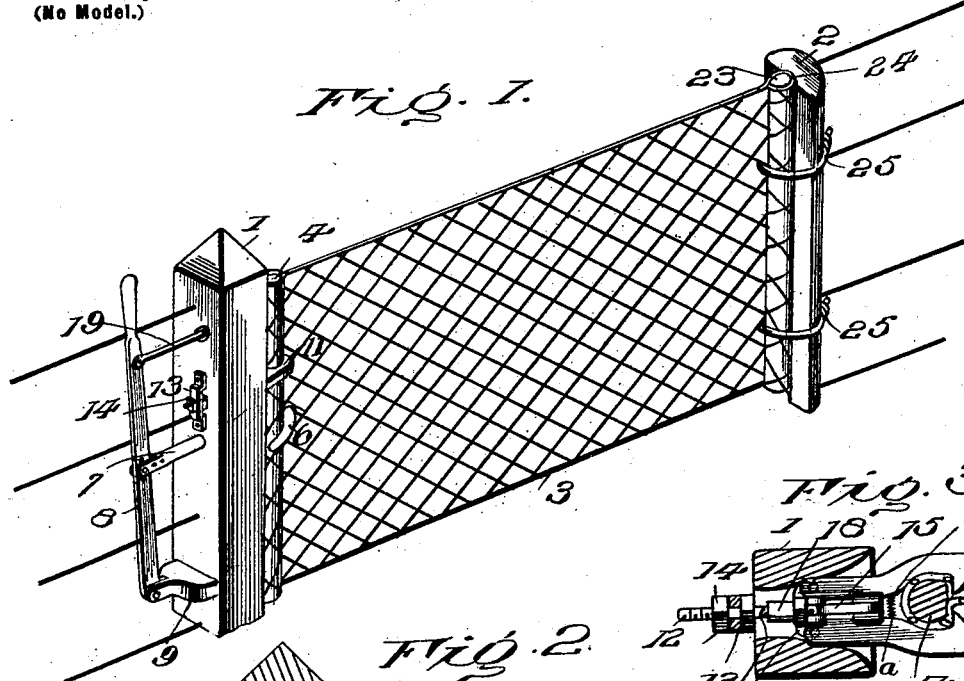
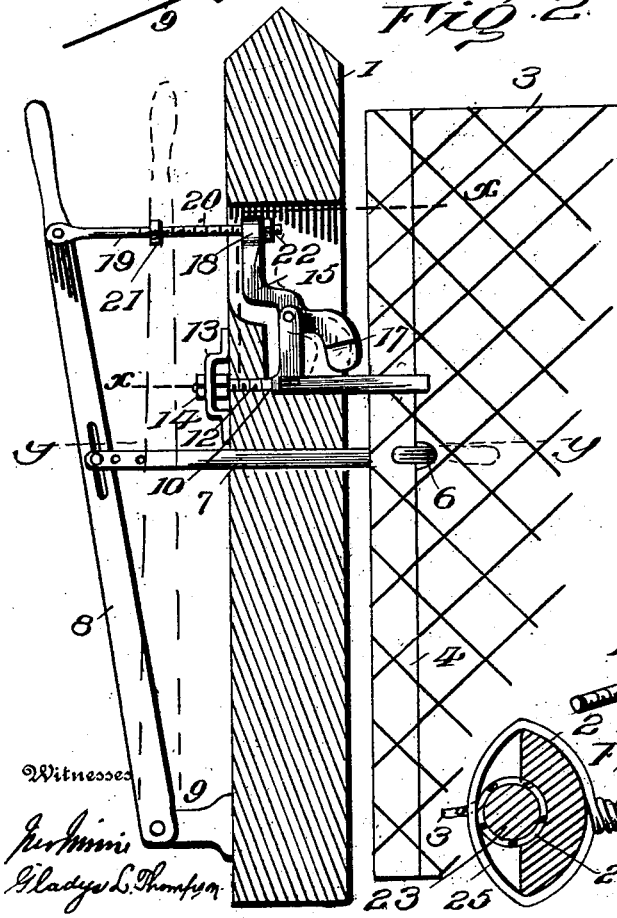
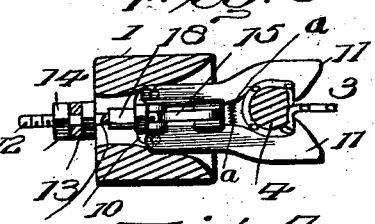
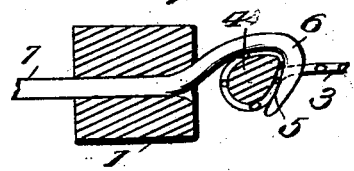
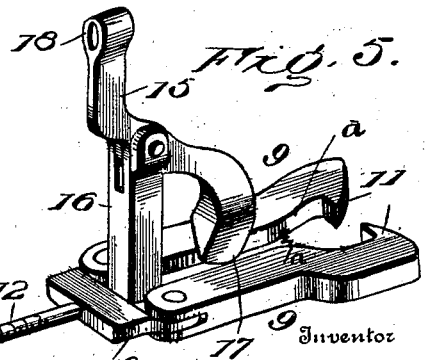
Inventor
D. W. Myers
THE NORRIS PETERS CO., PHOTO-LITHO., WASHINGTON, D. C.

UNITED STATES PATENT OFFICE.

DANIEL W. MYERS, OF BUCYRUS, OHIO.

GATE.

SPECIFICATION forming part of Letters Patent No. 689,507, dated December 24, 1901.

Application filed September 10, 1901. Serial No. 74,974. (No model.)

*To all whom it may concern:*

Be it known that I, DANIEL W. MYERS, a citizen of the United States, residing at Bucyrus, in the county of Crawford and State of Ohio, have invented certain new and useful Improvements in Gates; and I do hereby declare the following to be a full, clear, and exact description of the invention, such as will enable others skilled in the art to which it appertains to make and use the same.

This invention has relation to the class of flexible gates which require straining when closing and securing means to hold them under tension when closed. An essential feature is the provision of a single lever for straining the gate and to effect a release thereof from the holding means when it is required to open the gate.

For a full description of the invention reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a gate embodying the invention. Fig. 2 is a vertical section of the latch-post and adjacent end portion of the gate, showing the straining and holding means on a larger scale. Fig. 3 is a transverse section on the line X X of Fig. 2. Fig. 4 is a section on the line Y Y of Fig. 2. Fig. 5 is a perspective view of the gate-holding means and the releasing device. Fig. 6 is a plan section of the hinge-post and contiguous end of the gate.

Corresponding and like parts are referred to in the following description and indicated in all the views of the drawings by the same reference characters.

The latch-post 1 and hinge-post 2 are arranged upon opposite sides of the opening in the fence closed by the gate 3, which is flexible, being preferably composed of wire fabric having a reinforcing rod or bar applied to each end. The rod or bar 4 at the free or swinging end of the gate has an inclined portion 5, to be engaged by the extremity of the hook 6 after its being passed through an opening in the gate fabric and insure its firm engagement with the part 4. The shank 7 of the hook 6 has adjustable connection with an upright lever 8, fulcrumed at its lower end to a block or bracket 9, secured to the latch-post 1. The shank 7 is slidably mounted in a transverse opening formed in the post 1.

When it is required to close the gate, the hook 6 is engaged with the rod or bar 4 and the lever 8 is operated to stretch or strain the gate, this being essential to the efficiency and appearance of the gate. The gate is secured when properly strained by holding means, which in the present instance consist of a pair of oppositely-disposed catches 9, pivoted at one end to a cross-head 10 and having their opposite end formed with a hook 11 for engagement with the part 4. A spring $a$ normally draws the hooks 11 together and holds them in engagement with the rod or bar 4. The cross-head 10 is formed with or has applied thereto a threaded stem 12, which passes through an opening in the post 1 and through a keeper 13, secured to said post, a pair of nuts 14, mounted upon the stem 12, one upon each side of the keeper 13, serving to adjustably connect the cross-head end with the post 1, whereby the gate-holding means may be adjusted in or out, as desired, for securing the gate when strained to the desired tension. When straining the gate the rod or bar 4 is pressed between the hooks 11, which are forced apart, and after the part 4 has cleared the shoulders of the hooks the latter spring inward under the tension of the spring $a$ and engage with the said post, as shown most clearly in Fig. 3, and hold the gate closed under tension.

It is desirable to utilize the lever 8 for effecting a release of the gate, and for this purpose the means shown have been devised and consist of a lever 15, pivoted about midway of its ends to a post 16, attached to the cross-head 10. This lever 15 is offset midway of its ends, and its lower end is constructed to provide a wedge 17 for entrance between the catches 9 to force their hooked ends apart and to release the rod or bar 4, thereby liberating the gate. The upper end of the releasing-lever 15 is shaped to provide a sleeve or eye 18, through which a rod 19, connected at its outer end to the lever 8, is adapted to have movement, said rod being threaded, as shown at 20, and having nuts 21 and 22 mounted upon the threaded portion and constituting adjustable stops. When the upper end of the lever 8 is moved away from the latch-post, the hook 6 is brought into engagement with the rod or bar 4 and the gate is strained and said rod or bar is pressed between the hooked ends 11 of the catches 9 and held thereby During this movement of the lever the stop 22 engages with the releasing-lever 15 and elevates its wedge end and withdraws it from between the catches 9, thereby permitting the latter to close under the action of the spring 12. When it is required to open the gate, the upper end of the lever 8 is moved toward the post 1, and this movement disengages the hook 6 from the rod or bar 4, and subsequently the stop 21 is brought into contact with the upper end of the lever 15 and vibrates the lever upon its fulcrum and forces the wedge 17 between the catches 9, thereby spreading the hooks 11 and releasing the rod or bar 4 and permitting the gate to swing open from either side.

The rod or bar 23 at the hinge end of the gate 3 is inclosed in a folded part of the gate fabric and is seated in a vertical groove 24, formed in a side of the hinge-post 2 facing the gate-opening. Binders 25 secure the part 23 and gate to the hinge-post, and consist of lengths of wire encircling the post 2 and rod or bar 23, having their ends twisted together. By having the part 23 seated in the groove 24 the gate is prevented from lateral play at its hinge end and by having the binders 25 enter grooves in the sides of the post 2 the gate is prevented from having any vertical play. In the event of the gate being opened to such an extent as to strain the wires or elements adjacent the part 23 the latter will turn in the seat 24 before any injury to the gate can be effected.

Having thus described the invention, what is claimed as new is—

1. In combination with a flexible gate and straining means therefor, holding means for securing the gate when stretched, the same consisting of oppositely-disposed catches for embracing opposite sides of the gate and having hooked ends for engagement therewith, substantially as set forth.

2. In combination with a flexible gate and straining means therefor, holding means for securing the gate when stretched, the same comprising oppositely-disposed pivoted catches, a support therefor, and means for adjustably connecting the catches to the support, the same consisting of a threaded stem and a pair of nuts mounted thereon, substantially as set forth.

3. In combination with a flexible gate, and straining means therefor including a lever, holding means for securing the gate when stretched, and means for releasing the gate from the said holding means actuated by the aforesaid lever, substantially as set forth.

4. In combination with a flexible gate and straining means therefor including a lever, holding means for securing the gate when stretched, the same comprising oppositely-disposed catches, and a releasing device to be forced between the catches and operated by means of the aforementioned lever, substantially as set forth.

5. In combination with a flexible gate and straining means therefor including a lever, gate-holding means comprising oppositely-disposed catches, a releasing device for spreading the catches by entrance therebetween, and a rod connected with the aforementioned lever and having spaced stops for engagement with the said releasing device for positive operation thereof, substantially as set forth.

6. In combination with a flexible gate and straining means therefor including an operating-lever, gate-holding means comprising a cross-head and oppositely-disposed catches, a releasing-lever for spreading the catches supported by the said cross-head, and actuating means for the releasing-lever having connection with the aforementioned operating-lever, substantially as set forth.

7. In combination with a flexible gate, and straining means therefor including an operating-lever, a cross-head, adjusting means therefor, oppositely-disposed catches connected with the said cross-head, a releasing-lever supported by the said cross-head, a rod connected to the aforementioned operating-lever, and adjustable stops upon said rod for engagement with the releasing-lever, substantially as set forth.

8. In combination, a flexible gate, a rod inclosed in a folded end portion of the gate, a hinge-post having a groove forming a seat to receive the said rod, and binders encircling the rod and post and serving to connect the gate thereto, substantially as set forth.

In testimony whereof I affix my signature in presence of two witnesses.

DANIEL W. MYERS. [L. S.]

Witnesses:
ISAAC CAHILL,
ANSON WICKHAM.